(12) United States Patent
Gooch

(10) Patent No.: US 8,378,838 B1
(45) Date of Patent: Feb. 19, 2013

(54) OPTICAL DRIVE EMPTINESS INDICATOR

(75) Inventor: Robert Page Gooch, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 776 days.

(21) Appl. No.: 12/606,215

(22) Filed: Oct. 27, 2009

(51) Int. Cl.
*G08B 5/00* (2006.01)

(52) U.S. Cl. ............... 340/815.4; 340/686.1; 340/691.1; 340/693.5; 369/2

(58) Field of Classification Search ............... 340/815.4, 340/686.1, 691.1, 693.5, 815.47, 815.49, 340/815.5, 815.57, 815.7, 815.78, 815.8, 340/815.81, 815.83, 686.4; 369/2, 6, 33.01, 34.01, 30.18, 30.2, 53.31, 53.32
See application file for complete search history.

(56) References Cited

U.S. PATENT DOCUMENTS

| | | | | |
|---|---|---|---|---|
| 4,205,853 | A * | 6/1980 | Torrington | 720/626 |
| 6,134,192 | A * | 10/2000 | Gorzelski et al. | 369/2 |
| 6,252,832 | B1 * | 6/2001 | Furukawa et al. | 369/30.32 |
| 6,625,097 | B1 * | 9/2003 | Sakurai | 369/53.2 |

* cited by examiner

*Primary Examiner* — Anh V La

(74) *Attorney, Agent, or Firm* — Meunier Carlin & Curfman, LLC

(57) ABSTRACT

In one embodiment, an optical drive emptiness indicator including a base and a flag output partially extends outside of an optical drive into which it is loaded to provide a load status of the optical drive.

20 Claims, 10 Drawing Sheets

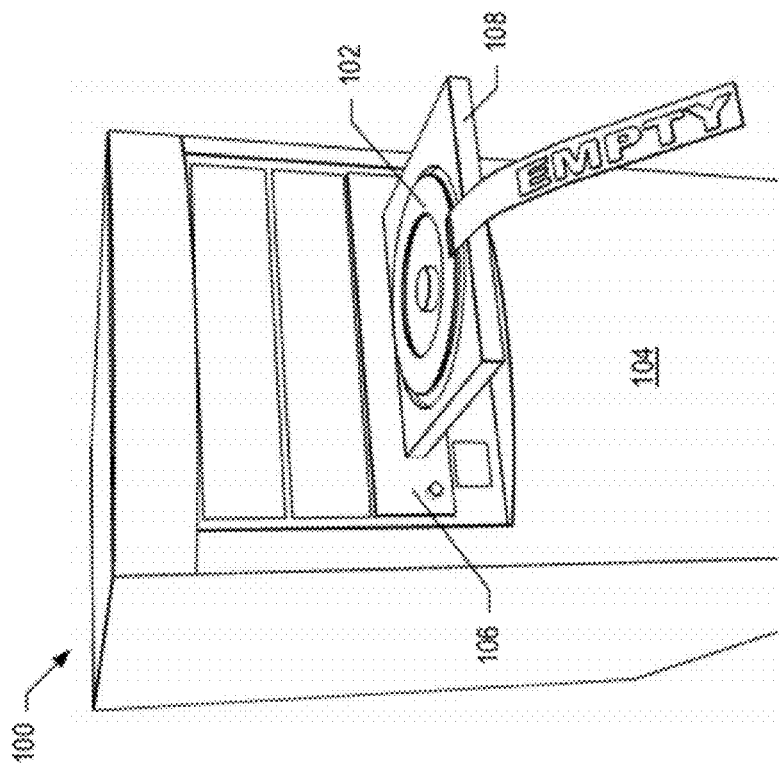
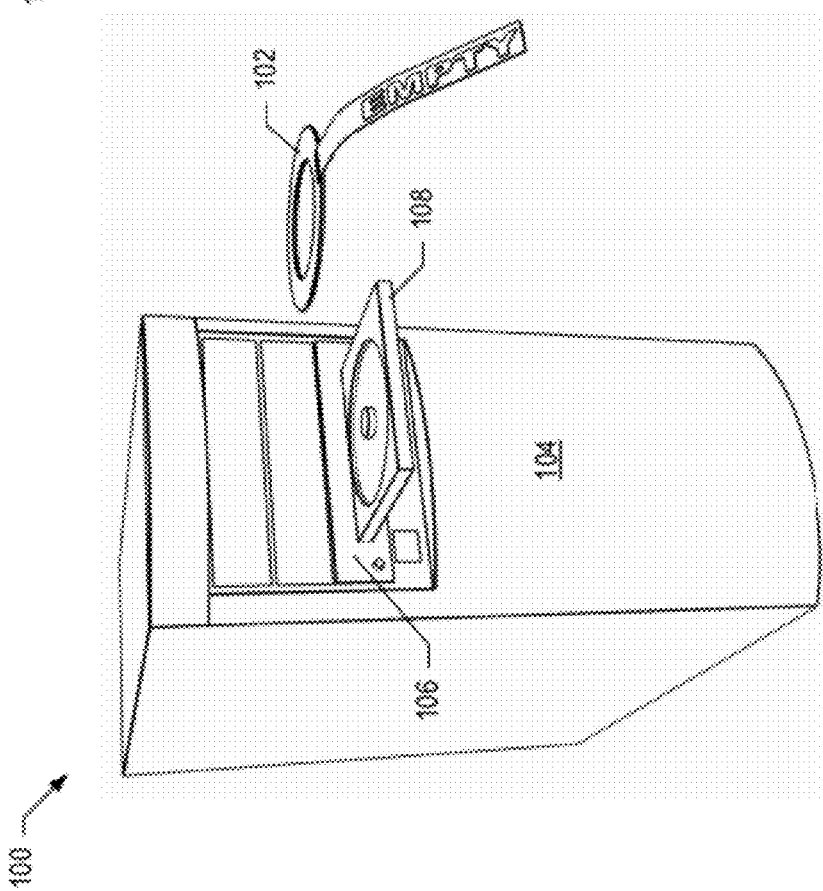
FIG. 1B
FIG. 1A

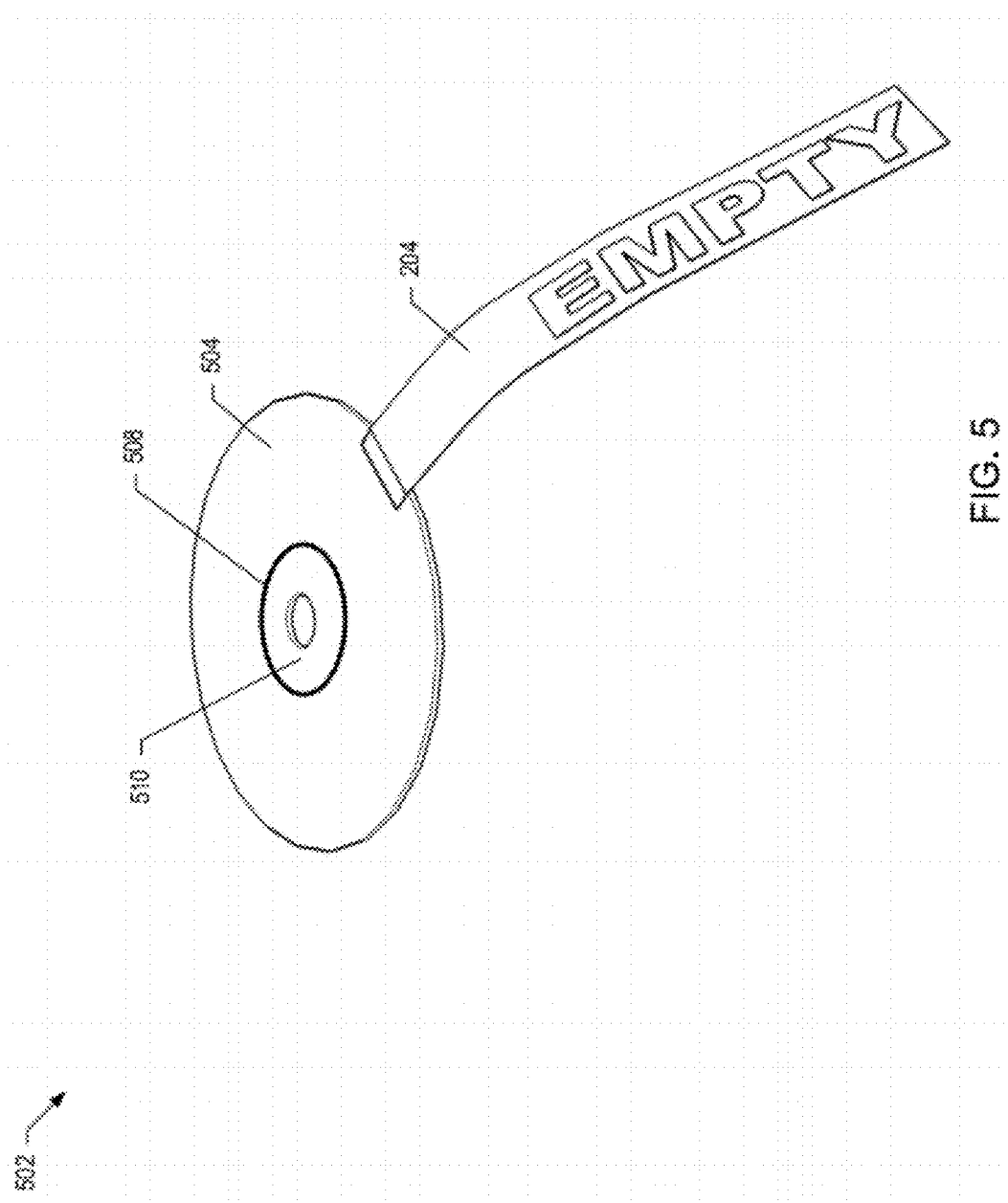

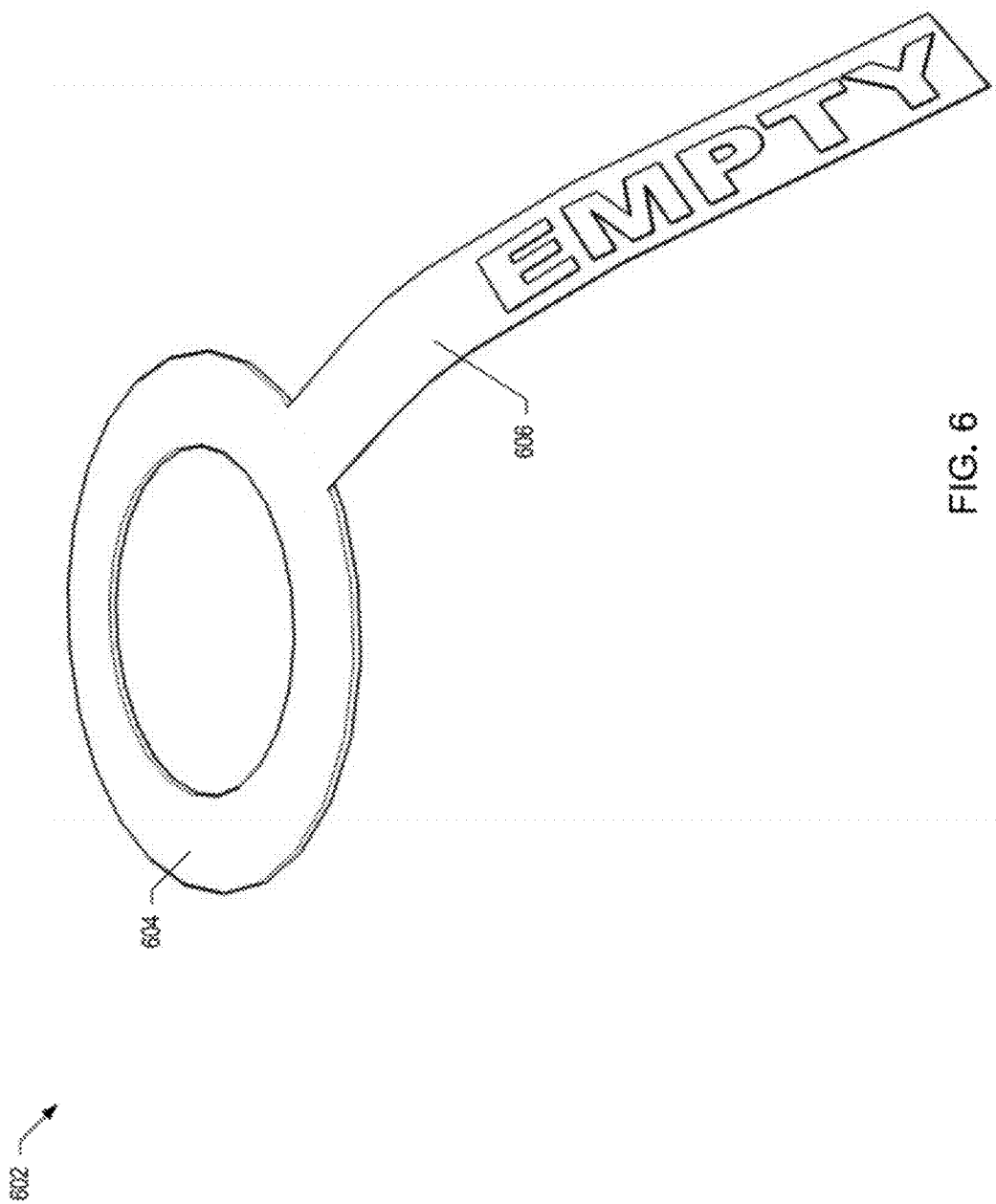

OPTICAL DRIVE EMPTINESS INDICATOR

TECHNICAL FIELD

The present disclosure relates generally to optical discs and optical disc drives.

BACKGROUND

Optical storage media include compact discs (CDs) and digital versatile discs (DVDs) that are commonly used to store digital data on a plastic substrate. These discs are read by optical disc drives that spin the discs while focusing a laser on the spinning disc. Changes in the reflection of the laser from the spinning disc are measured to read the data stored on the disc. Some optical drives can also write data to recordable media using a laser to change the light reflecting characteristics of photosensitive materials in the recordable media.

Optical drives are used in a number of devices including personal computers, computer servers, CD players and recorders, DVD players and recorders, and video game consoles. Optical discs are used, e.g., to store computer data, to transfer data between computers, to install software, update software, and to deliver audio and video. In order for an optical drive to read or write a disc, the disc is first loaded into the optical drive. There are a number of loading mechanisms for single disc optical drives with the two most prevalent loading types generally being tray loading, and slot loading drives.

OVERVIEW

In general, one aspect of the subject matter described in this specification can be embodied in an apparatus including a base configured for loading into an optical disc drive, the base including a ring of material having an outer diameter of 120 millimeters or less, an inner diameter greater than 31 millimeters, and a thickness less than 1.5 millimeters, and a flag made of flexible material attached to the base at a first flag end, wherein the flag has dimensions such that a second flag end will extend outside of an optical disc drive into which the base has been loaded.

One aspect of the subject matter described in this specification can be embodied in an apparatus including a base including a ring of material having an outer diameter of 120 millimeters or less, an inner diameter greater than 31 millimeters, and a thickness less than 1.5 millimeters, a flag made of flexible material, and means for attaching a first flag end to the base, wherein the flag has dimensions such that a second flag end will extend outside of an optical disc drive into which the base has been loaded.

One aspect of the subject matter described in this specification can be embodied in methods that include the actions of removing an inner ring section of an optical disc, the remaining outer ring of the optical disc making a base, and attaching a flag to the base at a first flag end, wherein the flag has dimensions such that a second flag end will extend outside of an optical disc drive into which the base has been loaded.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1D illustrate an example environment of an optical drive emptiness indicator.

FIG. 5 illustrates a perspective view of an example optical drive emptiness indicator having a base with a center bearing.

FIG. 6 illustrates a perspective view of an example optical drive emptiness indicator having an integrally formed base and flag.

Like reference numbers and designations in the various drawings indicate like elements.

DESCRIPTION OF EXAMPLE EMBODIMENTS

Figure 1D:
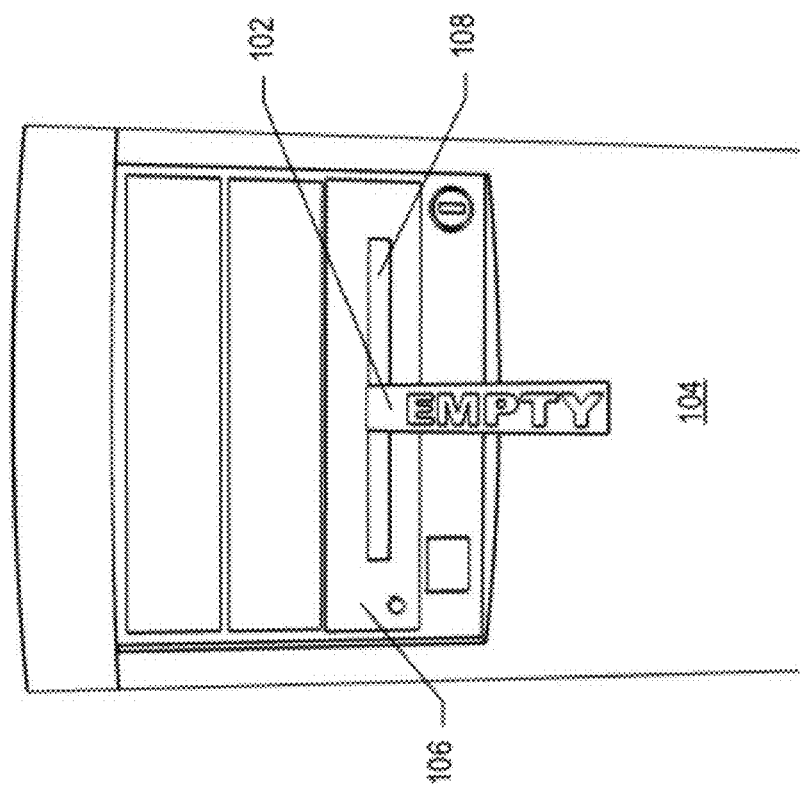

FIGS. 1A-1D illustrate an example environment 100 of an optical drive emptiness indicator 102. In FIG. 1A an example optical drive emptiness indicator 102 is shown near a computer 104 that includes a tray loading optical drive 106 having a tray 108 in an extended or open position. Determining if a given optical drive is empty or instead holds an optical disc often requires, for example, that the drive be opened to extend its tray, or that an eject button on a slot loading drive be pressed to eject any discs that might be inside the drive. The optical drive emptiness indicator 102 can be loaded into an empty drive with part of the indicator extending outside of the drive to provide a visual indication that a given optical drive is empty.

A quick visual indication that an optical drive is empty can be useful in many situations and environments to, for example, aid in preventing misplaced, lost, or left behind optical discs. In an environment where there are many computers such as a server room, for example, the optical disc emptiness indicator can save time, trouble, and frustration in ensuring that all optical discs have been removed from optical drives and/or searching for a missing optical disc. Without an optical drive emptiness indicator ensuring these optical drives are empty, searching for a missing disc could require, for example, opening the tray and/or pressing the eject button on each optical drive in the server room.

In addition, the optical drive emptiness indicator 102 can, for example, help to secure sensitive, proprietary, and/or secret information stored on optical discs. In some cases, an optical disc can include sensitive, proprietary, and/or secret information such as, for example, customer data, patient data, copyrighted material, source code, trade secrets, and/or government secrets. Where such data is transferred using optical discs, optical disc emptiness indicators 102 can be used, for example, as part of a set of security policies to help prevent data from being compromised. For example, if sensitive data is stored and regularly updated across a set of servers, securities policies at a given facility can call for an optical drive emptiness indicator to be placed in all empty optical drives to prevent an optical disc from being inadvertently left in an optical drive.

FIG. 1B shows the optical drive emptiness indicator 102 placed on the tray 108 in the area designed to receive an optical disc. The optical drive tray 108 can be closed with a portion of the optical drive emptiness indicator 102 inside and a portion extending outside of the optical drive to provide a visual indication that the optical drive is empty.

Figure 1C:
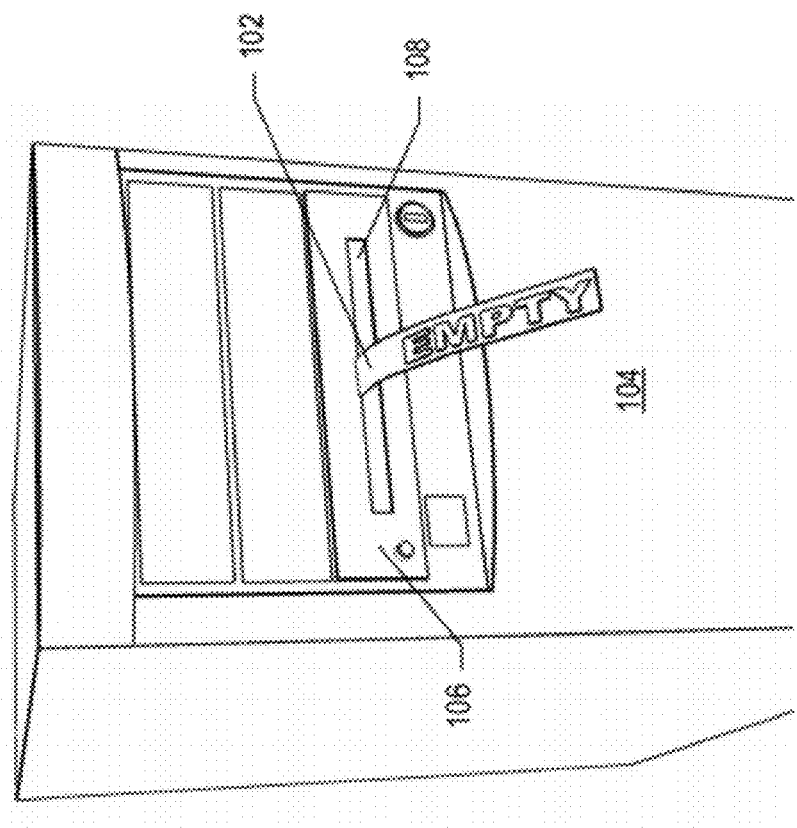

FIG. 1C and FIG. 1D illustrate a portion of the example optical drive emptiness indicator 102 extending outside the optical drive 106 with the tray 108 in a retracted or closed position. Writing on the optical drive emptiness indicator, in this case the word "EMPTY", can be read on the portion of the optical drive emptiness indicator that remains outside of the closed optical drive.

Figure 2:
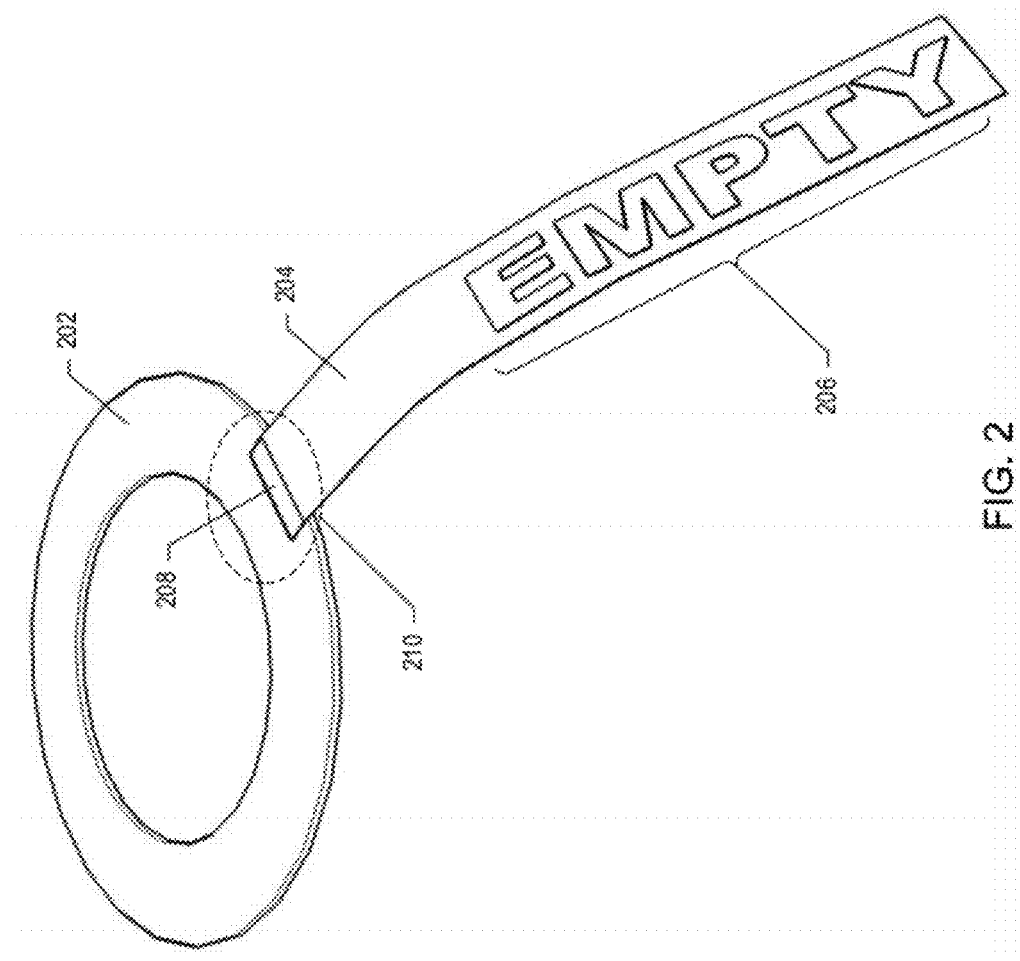
FIG. 2 illustrates a perspective view of an example optical drive emptiness indicator.

FIG. 2 illustrates a perspective view of an example optical drive emptiness indicator 102. The example optical drive emptiness indicator 102 includes a base 202 and a flag 204. The flag 204 can optionally include writing or other indicia (e.g., a symbol) such as the writing 206 which in the example shown is the word "EMPTY". In some implementations, this writing can be oriented vertically (each letter rotated 90 degrees counter-clockwise from the orientation shown in FIG. 2). The writing can include other words and/or phrases and can be written in any language. The flag 204 can have a color that contrasts with the colors normally used for optical drives and/or computer equipment so that the flag can be more easily noticed. The flag 204 can be attached to the base 202 in the general attachment area 210 such as at the example attachment interface area 208. Various alternatives for attaching a flag 204 of an optical drive emptiness indicator to a base 202 are discussed below.

Figure 3:
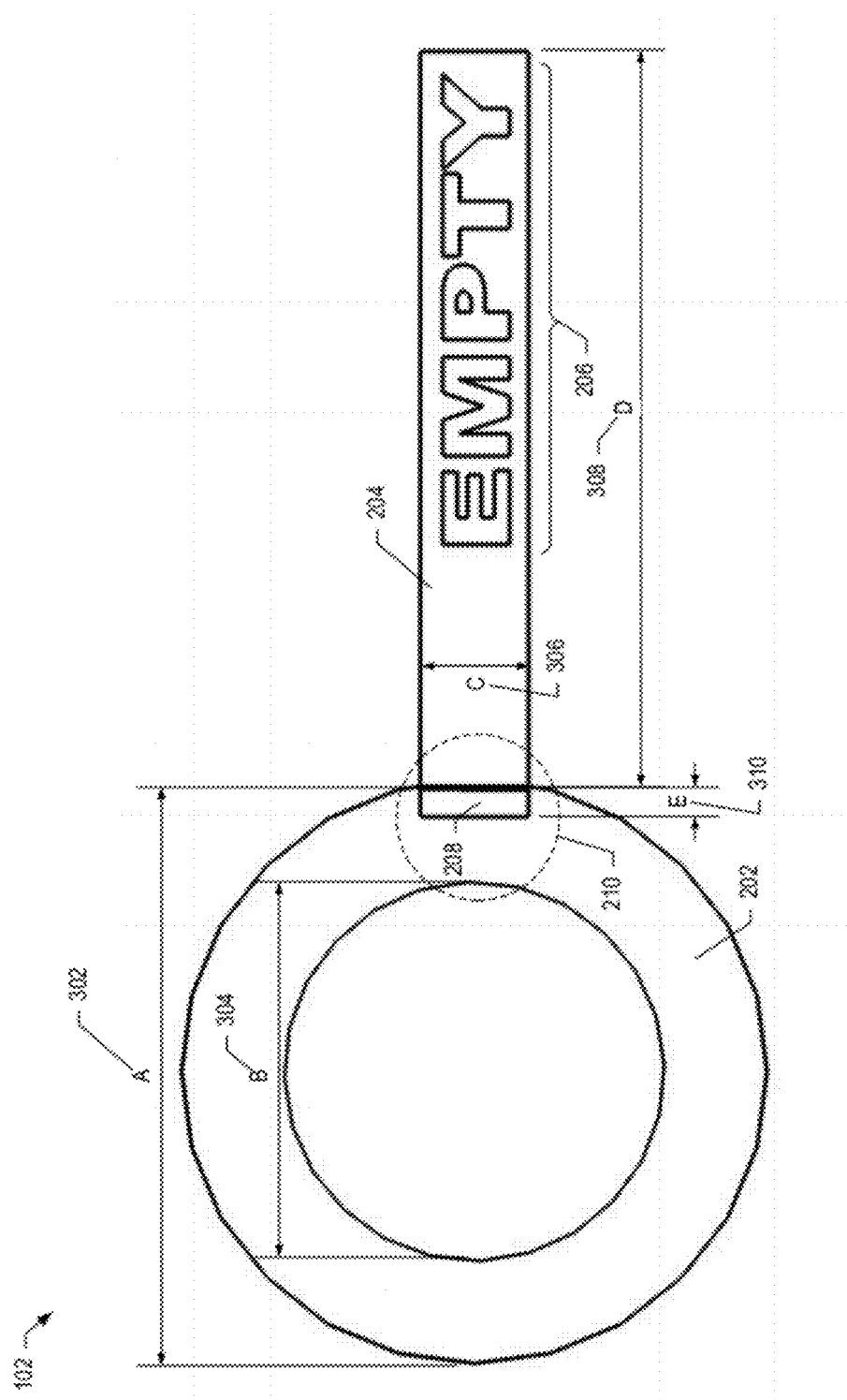
FIG. 3 illustrates a plan view of an example optical drive emptiness indicator.

FIG. 3 illustrates a plan view of an example optical drive emptiness indicator 102. The base 202 can have an outside diameter measurement 'A' (302). In some implementations measurement 'A' is equal to approximately 120 millimeters which is the standard outside diameter measurement for CDs and DVDs. In some implementations, measurement 'A' can be less than 120 mm, but not less than the inside diameter measurement 'B' (304). In some implementations, measurement 'B' is greater than 31 millimeters. Optical drives generally have a clamping mechanism for spinning a loaded optical disc using, for example, concentric clamping rings that clamp the disc between 29 and 31 millimeters from the center of the disc. Measurement 'B' can be greater than 31 millimeters to prevent standard optical drive clamping rings from clamping onto and attempting to spin the example optical drive emptiness indicator 102 upon it being loaded into an optical drive.

The flag 204 has a width 'C' (306), a length 'D' (308), and an interface area length 'E' (310). Measurement 'C' can be any width not greater than 120 mm, but in general, measurement 'C' is wide enough to make the flag 204 and/or any writing 206 on the flag 204 easily noticeable (by a human optical drive operator, for example) while the optical drive emptiness indicator is held in an optical drive. Measurement 'D' can be any length, is at least long enough for the flag to extend outside of a closed optical drive into which the optical drive emptiness indicator is loaded (e.g., 20 millimeters) and is generally long enough for the flag 204 to be easily noticeable outside of the closed optical drive. Measurement 'D' can be, for example, 6 inches (approximately 152.4 millimeters). In some implementations, measurement 'E' is less than the difference between measurement A and measurement B. The greater the length of 'E', the larger the interface area 208 can be for attaching the flag 204 to the base 202.

The flag 204 generally has a thickness that will permit an optical drive tray to close with the flag 204 extending outside of the optical drive with the optical drive emptiness indicator 102 inside the drive. In some implementations, for example, the flag 204 can be 0.18 millimeters thick. In some implementations, the flag 204 can have a thickness of up to 0.5 millimeters.

In some implementations, the base 202 includes only a partial ring of material as opposed to a complete ring. For example, the base 202 can be a half ring, a quarter ring, or some other fractional ring. In implementations using a partial ring, the minimum size of the ring is generally the size that has sufficient weight to lie flat in an optical drive tray while the tray mechanism closes with a flag attached to the base extending outside of the optical drive. In other implementations, the base has any shape that will permit an optical drive tray to fully close and sufficient weight to lie flat in an optical drive tray while the tray mechanism closes with a flag attached to the base extending outside of the optical drive.

FIGS. 4A-4F illustrate various example alternatives for attaching a flag 204 of an optical drive emptiness indicator 102 to a base 202. In general, the flag 204 can be attached to the base 202 using any known method of attaching discrete items including, but not limited to, using glue, adhesive, bonding agent, screws, rivets, staples, by sewing, threading, tying, wrapping, and/or fusing through application of heat or chemical.

The base 202 can be made of any type of material including, but not limited to, plastic, nylon, wood, cardboard, paper, metal, rubber, glass, and/or fiberglass. In some implementations, the base 202 is made of plastic similar to that of an optical disc. In some implementations, the base 202 is made from an optical disc, such as a new, used, or discarded optical disc. For example, a center or inner ring of a used optical disc can be removed to create the base 202 of the example optical drive emptiness indicator 102. The flag 204 is generally flexible and thin to permit the closing of an optical drive tray or permit the insertion of the optical drive emptiness indicator 102 into a slot loading drive while at least some part of the flag 204 extends out from the drive. The flag 204 can be made of any of a number of materials, including, but not limited to, fabric, ribbon, plastic, nylon, cardboard, paper, metal, and/or rubber.

In some implementations, the flag 204 can be attached to the base 202 in an attachment interface area that lies on a top surface plane of a base 202 with the flag 204 against a top surface of the base 202 (as is generally shown in FIG. 2). This mode of attachment can be used where the optical drive emptiness indicator 102 will be used in optical drives where the thickness of the flag 204 extending above the base 202 will not interfere with the operation of the optical drive loading mechanism. In some implementations, the method of attaching the flag 204 to the base 202 and/or the location of the attachment interface is modified to avoid interference issues with optical drive loading mechanisms.

Figure 4A:
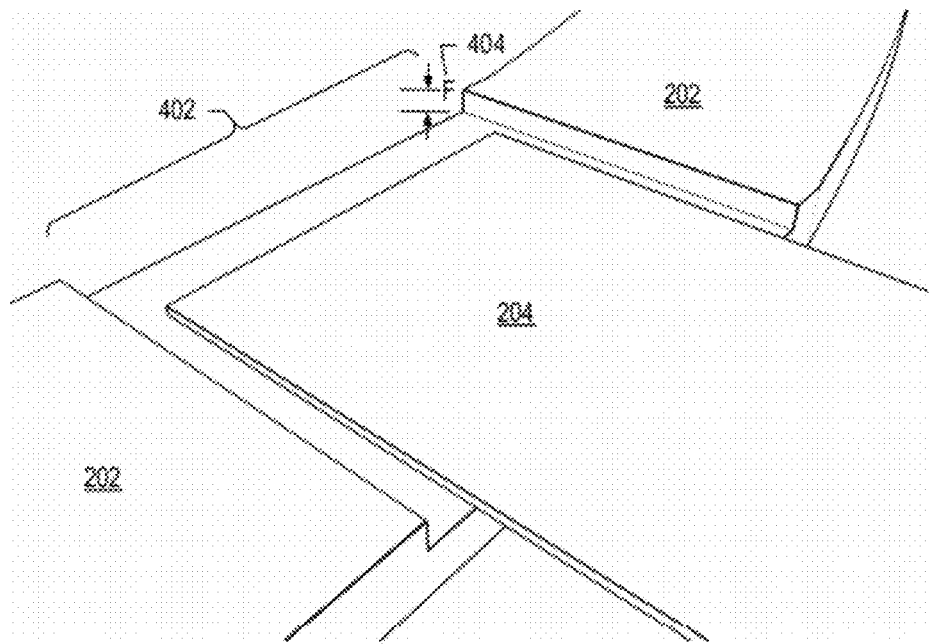
FIGS. 4A-4F illustrate various example alternatives for attaching a flag of an optical drive emptiness indicator to a base.

In the example of FIG. 4A, the flag 204 is shown attached to the base 202 lying in a channel 402 of the base 202. FIG. 4A (as with each of FIGS. 4A-4F) is not to scale and some features have been exaggerated for purposes of illustration. Optical discs generally have a nominal thickness of 1.2 millimeters though thicknesses of 1.1 millimeters to 1.5 millimeters are acceptable. To avoid interference issues with an optical drive loading mechanism, a channel 402 is located in the base 202 to permit the flag 204 to be recessed so that it does not extend (or extends less than it otherwise would) above a top surface plane of the base 202. The channel 402 has a depth 'F' (404) that can be deep enough to avoid interference between any part of the flag 204 and an optical drive loading mechanism. In some implementations the channel 402 can cut completely through the base 202 and the flag 204 can be attached to the base 202 at the edges of the channel 402.

Figure 4B:
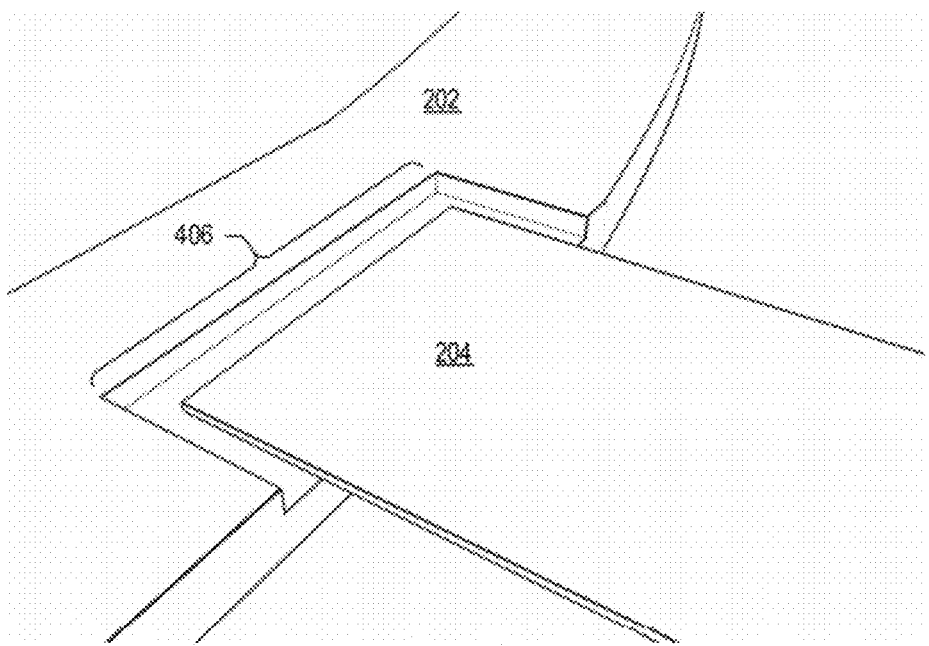

In the example of FIG. 4A the channel extends the across the base 202 at the interface area. In the example of FIG. 4B, the channel 406 extends across only part of the base 202 at the interface area. In some implementations, the depth 'F' (404) of channels 402 and 406 can be approximately the thickness of the flag 204 so that the flag 204 is flush with a top surface plane of the base 202 at the interface area.

Figure 4C:
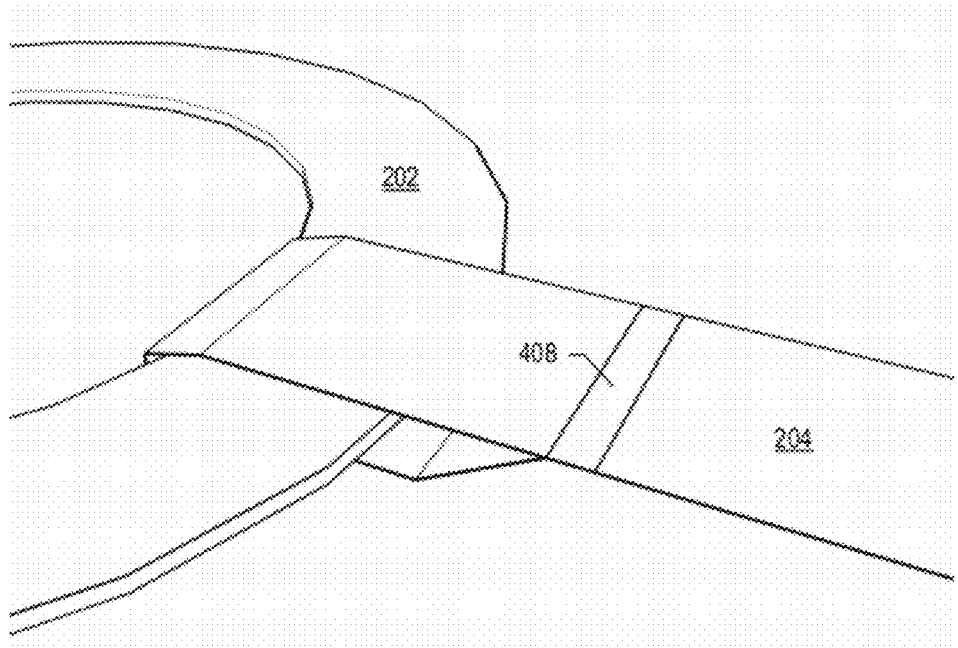
Figure 4D:
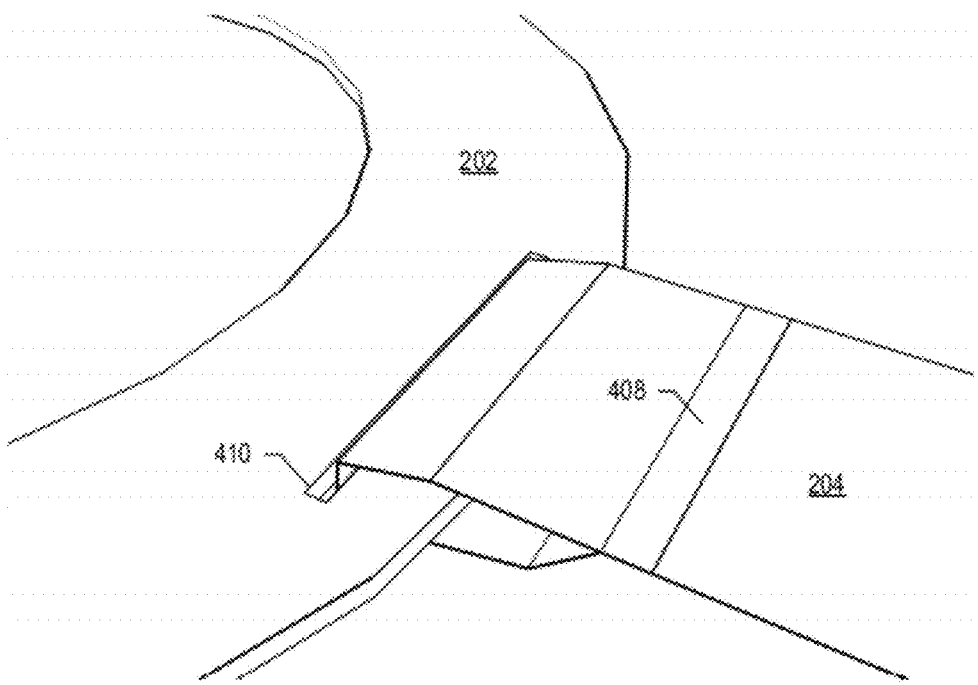

The example of FIG. 4C shows the flag 204 wrapped around the base 202 to attach the flag 204 to the base 202. The flag 204 can wrap around and attach to itself at area 408. The example of FIG. 4D shows the flag 204 wrapped around the base 202 through a slot 410 to attach the flag 204 to the base 202. As mentioned above, the dimensions in FIGS. 4C and 4D are exaggerated for purposes of illustration. The flag 204 can be wrapped around the base 202 more tightly than shown. In addition, in some implementations one or more channels can be added to the examples of FIG. 4C and FIG. 4D to recess the flag 204 below a top surface plane of the base 202. A channel can be added to the bottom surface of the base 202 to recess the wrapped flag 204 above a bottom surface plane of the base 202. In the example of FIG. 4C, a channel can be added to the inner diameter of the base 202 to recess the wrapped flag 204 so that the wrapped flag 204 does not extend inside the inner diameter of the base 202. In some implementations, the flag 204 can be glued (or attached using any of the attachment methods listed above or other attachment methods) to the base 202 to hold it in place in addition to being wrapped around the base 202 as shown in FIGS. 4C and 4D.

Figure 4E:
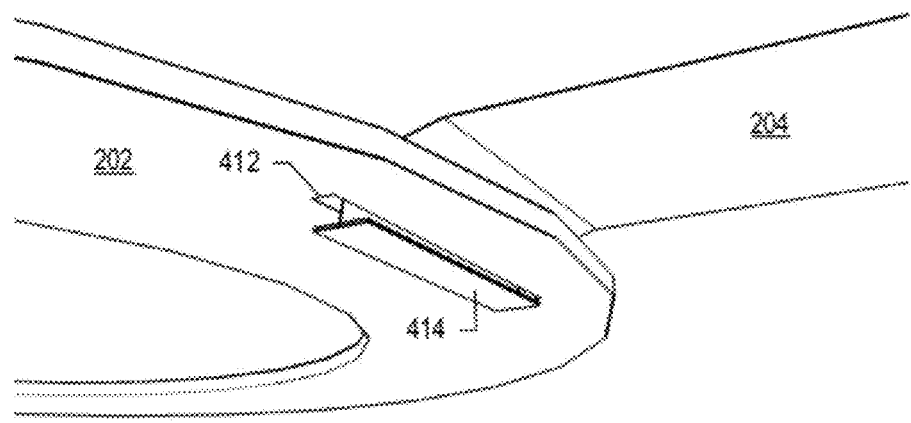

The example of FIG. 4E shows the flag 204 passing through a slot 412 with the end of the flag 204 having a blocking member 414 at a distal end to prevent the flag 204 from pulling through the slot 412. In some implementations, the blocking member and/or some other part of the flag 204 can be glued (or attached using any of the attachment methods listed above or other attachment methods) to the base 202 to hold it in place. In some implementations, a recessed area can be located on the bottom surface of the base 202 configured to receive the blocking member so that the blocking member does not extend below the bottom surface plane of the base 202.

Figure 4F:
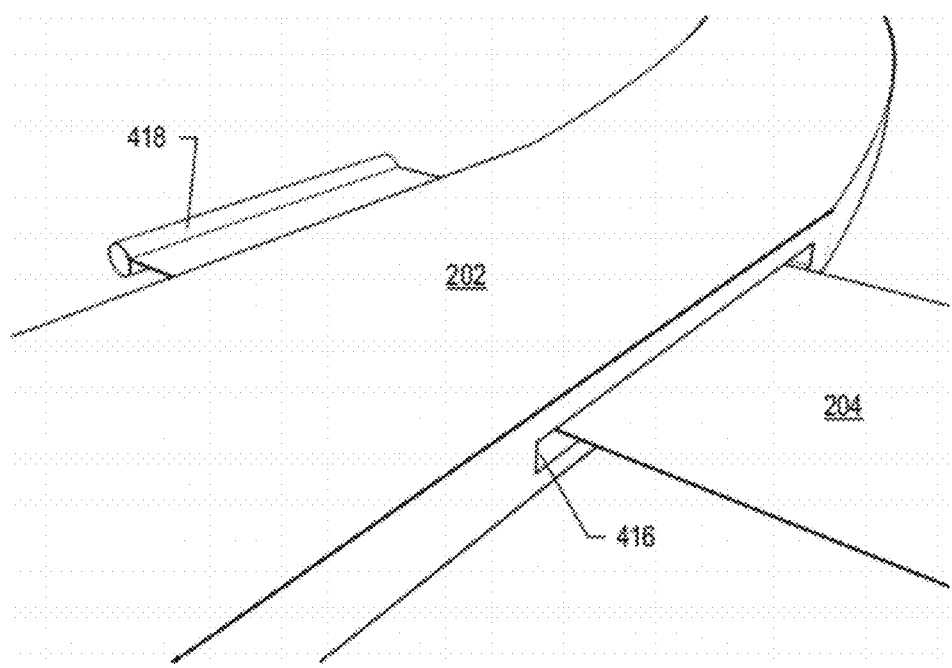

The example of FIG. 4F shows the flag 204 passing through a slot 416 extending radially through the base 202 between a top surface plane of the base 202 and a lower surface plane of the base 202. The flag 204 has a blocking member 418 at a distal end to prevent the flag 204 from pulling through the slot 416. In some implementations, the blocking member and/or some other part of the flag 204 can be glued (or attached using any of the attachment methods listed above or other attachment methods) to the base 202 to hold it in place. In some implementations, a recessed area can be located on the inner diameter of the base 202 configured to receive the blocking member so that the blocking member does not lie inside the inner diameter of the base 202.

In some implementations the flag can include a clip. For example, the flag can include a plastic or metal clip at one end. The clip can attach the flag to the base. The clip can, for example, be flexible such that the clip can pinch the base between two faces of the clip. Alternatively, the clip can pass through a hole or a slot in the base. For example, a flexible clip can be deformed to permit the clip to pass through a hole or slot in the base and the clip can assume its previous non-deformed shape to prevent the clip from becoming unattached from the base.

Means for attaching a flag 204 to a base 202 of an optical drive emptiness indicator can include the above described attachment alternatives (glue, adhesive, bonding agent, screws, rivets, staples, by sewing, threading, tying, wrapping, and/or fusing through application of heat or chemical) alone or in combination with one or more a slot, channel, blocking member, and clip as shown and/or described above.

FIG. 5 illustrates a perspective view of an example optical drive emptiness indicator 502 having a base 504 with a center bearing 508. The base 504 can have an inner diameter of less than 29 millimeters such that the inner part 510 of the base 504 inside of the bearing 508 can be grasped by a optical disc clamping mechanism and/or loading mechanism. The center bearing can be a low friction bearing such that an optical drive motor can spin the bearing without damage and/or without rotating the outer part of the base 504 and the flag 204.

FIG. 6 illustrates a perspective view of an example optical drive emptiness indicator 602 having an integrally formed base 604 and flag 606. The optical drive emptiness indication 602 can have dimension measurements 'A', 'B', 'C', and 'D' as described above with reference to FIG. 3. In the example implementation illustrated in FIG. 6, however, the base 604 and the flag 606 are integrally formed. For example, the optical drive emptiness indicator can be cut from a sheet of material (e.g., plastic) and/or cast from a mold.

Figure 7:
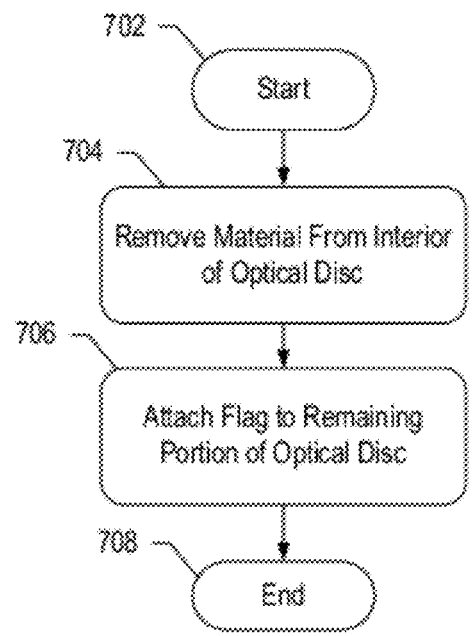
FIG. 7 is a flowchart of an example method for creating an optical drive emptiness indicator.

FIG. 7 is a flowchart of an example method for creating an optical drive emptiness indicator. The method starts at block 702, and at block 704 material is removed from the interior of an optical disc. For example, an inner ring section can be removed from the optical disc. The removed inner disc section can have an outside diameter equal to the measurement 'B' shown in FIG. 3. The removal of the inner disc section can create a base (base 202, for example) of an optical disc emptiness indicator. At block 706 a flag is attached to the remaining portion of the optical disc. For example, a flag (flag 204, for example) can be attached the base created at block 704. The method ends at block 708.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. An apparatus comprising:
    a base configured for loading into an optical disc drive, the base comprising a ring of material having an outer diameter of 120 millimeters or less, an inner diameter greater than 31 millimeters, and a thickness less than 1.5 millimeters; and
    a flag comprising flexible material, the flag being attached to the base at a first flag end,
    wherein the flag has dimensions such that a second flag end will extend outside of the optical disc drive into which the base has been loaded.

2. The apparatus of claim 1, wherein the base comprises a modified optical disc drive.

3. The apparatus of claim 1, wherein the flag comprises ribbon.

4. The apparatus of claim 1, wherein the flag has a width of less than 120 millimeters and a length of at least 20 millimeters.

5. The apparatus of claim 1, wherein the flag includes writing indicative of an optical drive loading status.

6. The apparatus of claim 1, wherein the flag includes writing indicative of an optical drive being empty.

7. The apparatus of claim 1, wherein the first flag end is glued to the base.

8. The apparatus of claim 1, wherein the flag is wrapped around the base at the first flag end.

9. The apparatus of claim 1, wherein the base includes a channel and a portion of the flag lies in the channel.

10. The apparatus of claim 1, wherein the base includes a slot and the flag passes through the slot.

11. The apparatus of claim 10, wherein the flag includes a blocking member at the first flag end.

12. The apparatus of claim 10, wherein the slot is a vertical slot.

13. The apparatus of claim 10, wherein the slot is a radial slot.

14. The apparatus of claim 10, wherein the length of the flag between the first flag end and the second flag end is 6 inches or more.

15. The apparatus of claim 1, wherein the flag comprises a clip at the first flag end, the clip being attached to the base.

16. An apparatus comprising:
a base comprising a ring of material having an outer diameter of 120 millimeters or less, an inner diameter greater than 31 millimeters, and a thickness less than 1.5 millimeters;
a flag comprising flexible material;
means for attaching a first flag end to the base;
wherein the flag has dimensions such that a second flag end will extend outside of an optical disc drive into which the base has been loaded.

17. A method comprising:
removing an inner ring section of an optical disc, the remaining outer ring of the optical disc comprising a base;
attaching a flag to the base at a first flag end wherein the flag has dimensions such that a second flag end will extend outside of an optical disc drive into which the base has been loaded.

18. The method of claim 16, wherein attaching the flag to the base comprises gluing flag to the base.

19. The method of claim 16, wherein attaching the flag to the base comprises wrapping the flag around the base at the first flag end.

20. The method of claim 16, further comprising:
creating a slot in the base; and
placing a blocking member at the first flag end,
wherein attaching the flag to the base comprises sliding the flag through the slot.

* * * * *